A. W. THOMPSON.
RELEASING DEVICE FOR STOCK.
APPLICATION FILED DEC. 30, 1907.
930,505.
Patented Aug. 10, 1909.
2 SHEETS—SHEET 1.
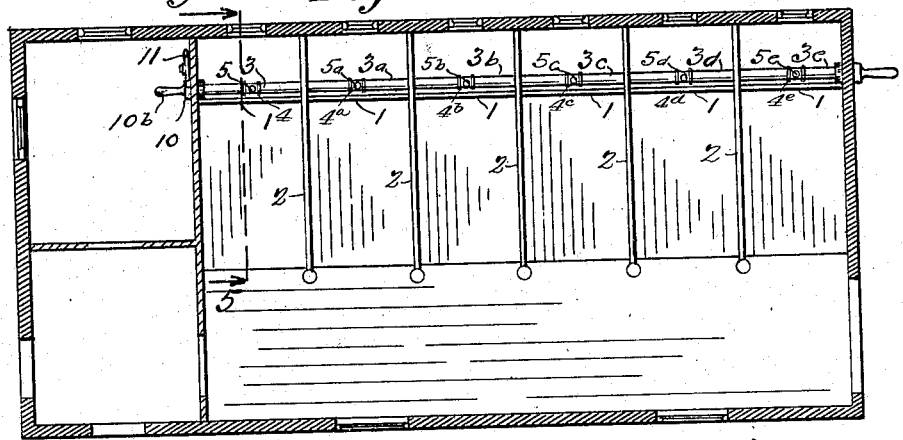
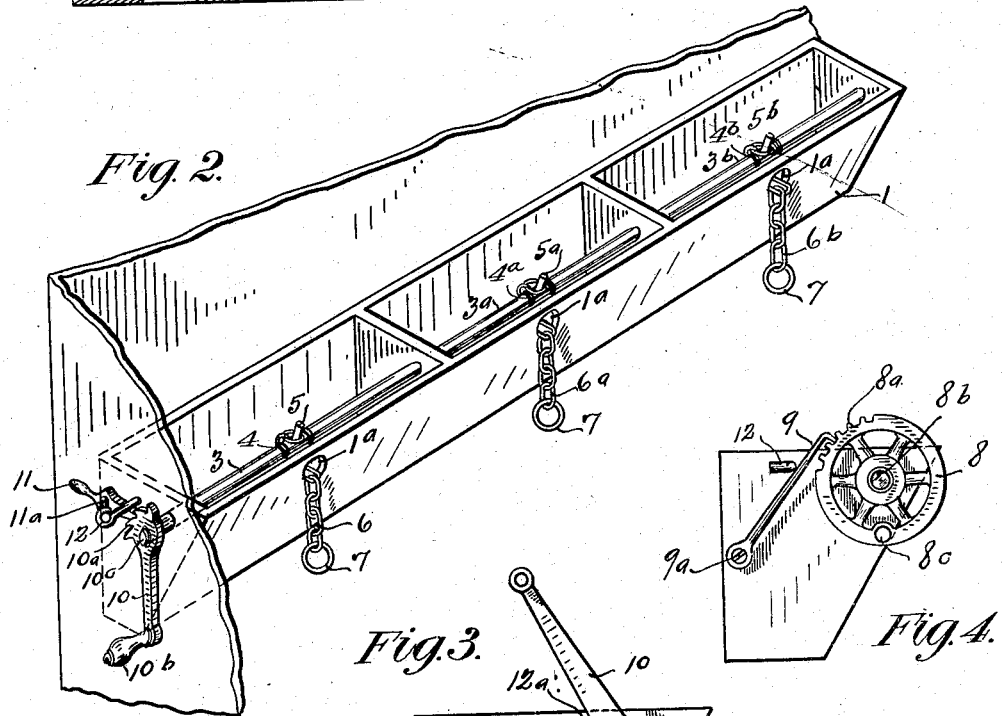
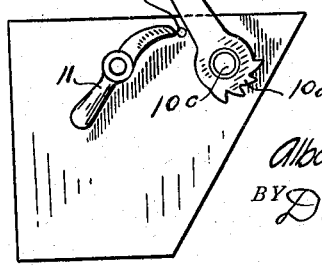
WITNESSES:
Charles Brosmann.
William N. Rees.
INVENTOR.
Albert W. Thompson.
BY Daniel W. Crockett
ATTORNEY.

UNITED STATES PATENT OFFICE.

ALBERT W. THOMPSON, OF WINCHESTER, INDIANA.

RELEASING DEVICE FOR STOCK.

No. 930,505.  Specification of Letters Patent.  Patented Aug. 10, 1909.

Application filed December 30, 1907. Serial No. 408,451.

*To all whom it may concern:*

Be it known that I, ALBERT W. THOMPSON, a citizen of the United States, residing at Winchester, in the county of Randolph and State of Indiana, have invented a new and useful Improvement in Releasing Devices for Stock, of which the following is a specification.

My invention relates to releasing devices for horses and other stock, the object of the invention being to provide a device by which horses and other stock haltered and confined in open stalls, may be instantly released, in case of fire or other emergency, without going into the stalls, thereby avoiding delay in releasing stock in such emergency, and the loss of stock by fire, and also the danger incident to entering stalls when stock are excited.

Figure 5:
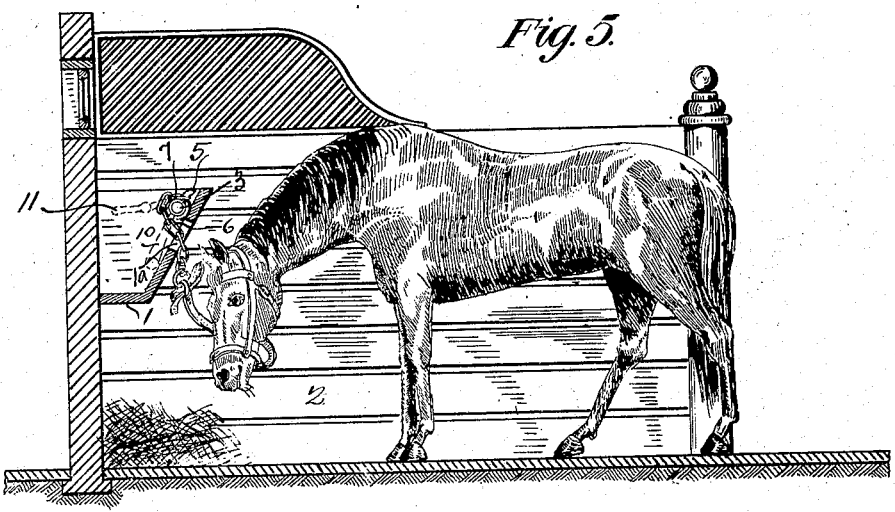
Figure 6:
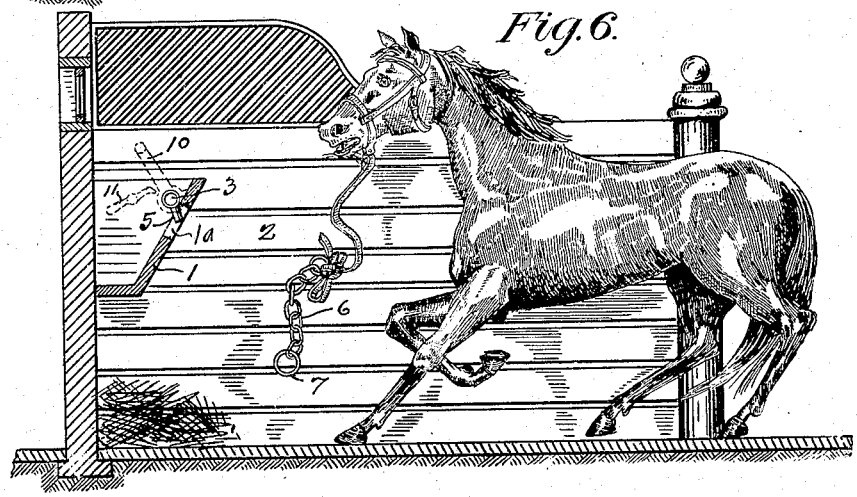

In describing this invention reference will be had to the accompanying drawings, in which:

Figure 1 is a horizontal sectional view of a barn, showing the stalls and mangers, and a releasing device attached thereto in operative position. Fig. 2 is a perspective view of the mangers, showing a releasing device attached thereto in normal position. Fig. 3 is an end view of a manger showing the device in a released position. Fig. 4 is an end view of the manger showing another form of releasing device attached thereto. Fig. 5 is a vertical sectional view of a stall and manger showing the device attached thereto in normal position, and a horse haltered thereto. Fig. 6 is a vertical sectional view of a stall and manger as shown in Fig. 5, showing the device attached thereto, in its released position and the horse released.

In the drawing 1 indicates a series of mangers and 2 the partitions between the stalls in the barn, the above description being given so that the operation of my improved device can be readily understood.

Extending longitudinally through the mangers in openings formed in the ends and the partitions, adjacent the front walls is a sectional rod which is mounted therein, so as to rock freely within the openings of the mangers, as will be hereinafter described. The rod is formed of a plurality of sections 3, $3^a$, $3^b$, $3^c$, $3^d$ and $3^e$, connected together by coupling sleeves 4, $4^a$, $4^b$, $4^c$, $4^d$ and $4^e$, provided with laterally projecting pins 5, $5^a$, $5^b$, $5^c$, $5^d$ and $5^e$, adapted to be normally held into engagement with the inner faces of the front walls of the respective mangers, over central openings formed in the mangers, adjacent their upper edges. The respective pins of the coupling sleeves are adapted to receive and securely hold the respective chains 6, $6^a$ and $6^b$, which extend through the respective openings of the mangers, and are held on the pins when they are thrown into engagement with the front walls of the mangers which are their normal positions, so that it will be impossible for the same to become detached, until the rod is rocked. Rings 7 are secured to the free ends of the respective chains, to which horses or other stock may be readily haltered.

Secured on one end of the section of the rod, at $10^c$, is a crank arm 10, provided with ratchet teeth $10^a$, and a handle $10^b$, the ratchet teeth being adapted to be engaged by a pawl 11, mounted at $11^a$, on the end of the manger, and is held in its normal position in engagement with the teeth of the ratchet by a pin 12. It will be seen that it is only necessary to disengage the pawl from the ratchet, in order to release the rod, so that when a slight pull is exerted upon the pin by the animal through the medium of the chain, the rod will rock so as to throw the pins into the position shown in Fig. 6, in which position the chains will drop off the pin, so as to release the animal.

In the modification shown in Fig. 4, I secure a wheel 8 to the rod at $8^b$, provided with ratchets $8^a$ and having a crank handle $8^c$ for operating the same. The ratchets are adapted to be engaged by a pawl 9, pivotally mounted at $9^a$ on the end of the manger, which is held in position by a similar pin 12.

Having thus fully described my invention, what I claim as new and desire to secure by Letters Patent is:—

In a fire escape for stock, the combination with a plurality of mangers, each having a central opening in its front wall, adjacent its upper edge, of a sectional rod extending longitudinally through said mangers adjacent their front walls, said rod being formed of a plurality of sections connected together by coupling sleeves located opposite each of the openings of said mangers, each sleeve being provided with a pin adapted to be normally held into engagement with the front walls of the mangers, chains passing through said openings of the manger under the couplings and up into engagement with the pins thereof, and a handle formed on said rod at one end for rocking the same, together with a pawl and ratchet for locking said rod in its adjusted position.

ALBERT W. THOMPSON.

Witnesses:
CLARKSON L. HUTCHINS,
FERMEN C. FOCHT.